(12) United States Patent
Squyres

(10) Patent No.: US 11,110,851 B2
(45) Date of Patent: Sep. 7, 2021

(54) CARGO DECKING BEAM END

(71) Applicant: B2B Casuals, Inc., Dallas, TX (US)

(72) Inventor: Jerrell P. Squyres, Point, TX (US)

(73) Assignee: B2B Casuals, Inc., Dallas, TX (US)

( * ) Notice: Subject to any disclaimer, the term of this patent is extended or adjusted under 35 U.S.C. 154(b) by 70 days.

(21) Appl. No.: 16/691,304

(22) Filed: Nov. 21, 2019

(65) Prior Publication Data

US 2021/0155148 A1 May 27, 2021

(51) Int. Cl.
*B60P 7/15* (2006.01)
*B64D 9/00* (2006.01)
*B61D 45/00* (2006.01)

(52) U.S. Cl.
CPC .............. *B60P 7/15* (2013.01); *B61D 45/00* (2013.01); *B64D 9/00* (2013.01)

(58) Field of Classification Search
CPC ......... B60P 7/15; B61D 45/00; B61D 45/001; B64D 9/00; B64D 9/003
USPC ......... 410/89, 117, 121, 122, 129, 130, 132, 410/137, 138, 139, 141–150
See application file for complete search history.

(56) References Cited

U.S. PATENT DOCUMENTS

| | | | | |
|---|---|---|---|---|
| 3,605,637 | A * | 9/1971 | Prete, Jr. ................... | B64C 1/20 410/105 |
| 6,074,143 | A * | 6/2000 | Langston .................. | B60P 1/00 410/143 |
| 8,172,494 | B1 * | 5/2012 | Knox ........................ | B60P 1/00 410/89 |
| 8,740,526 | B2 | 6/2014 | Knox | |
| 8,757,944 | B2 * | 6/2014 | Calico ....................... | B60P 1/02 410/89 |
| 8,979,451 | B2 * | 3/2015 | Downing .................. | B60P 7/15 410/144 |
| 2018/0050630 | A1 | 2/2018 | Kauffman et al. | |
| 2019/0270400 | A1 | 9/2019 | da Rosa et al. | |

\* cited by examiner

*Primary Examiner* — Hilary L Gutman
(74) *Attorney, Agent, or Firm* — Yee & Associates, P.C.

(57) ABSTRACT

A decking beam end assembly is provided. The assembly comprises a beam end body configured to be slidably disposed within an end of a hollow beam member. A U-shaped foot is pivotally coupled to the beam end body, wherein the foot further comprises a flanged head configured to be slidably captured within a capture area of an L-track. A latch is pivotally coupled to the foot, wherein the latch comprises a retaining lug configured to concurrently fit into two successive circular openings of the L-track and a straight rail opening in the L-track connecting the two circular openings.

15 Claims, 17 Drawing Sheets

CARGO DECKING BEAM END

BACKGROUND INFORMATION

1. Field

The present invention relates generally to the field of cargo containers and more specifically to a system of adjustable load beams that provide decking to divide the cargo container into multiple levels of payload.

2. Background

In freight transportation it is often desirable to stack cargo in multiple levels to take full advantage of the available height of containers such as truck trailers, aircraft, railroad cars, and other similar cargo containers. To facilitate this process it is common practice to employ removable decking beams capable of supporting the weight of heavy payloads.

Typically such decking beams are adjustable, allowing them to be repositioned within a cargo container at various heights and horizontal intervals, depending on the size and nature of the cargo.

SUMMARY

An illustrative embodiment provides a decking beam end assembly. The assembly comprises a beam end body configured to be slidably disposed within an end of a hollow beam member. A U-shaped foot is pivotally coupled to the beam end body, wherein the foot further comprises a flanged head configured to be slidably captured within a capture area of an L-track. A latch is pivotally coupled to the foot, wherein the latch comprises a retaining lug configured to concurrently fit into two successive circular openings of the L-track and a straight rail opening in the L-track connecting the two circular openings.

Another illustrative embodiment provides an adjustable decking system for use in a cargo container. The decking system comprising a pair of L-tracks vertically mounted on opposite interior walls of a cargo container. A hollow decking beam configured to support cargo loads includes first and second end assemblies at opposite ends of the decking beam. Each end assembly comprises a beam end body configured to be slidably disposed within an end of the decking beam. A U-shaped foot is pivotally coupled to the beam end body, wherein the foot comprises a flanged head configured to be slidably captured within a capture area of the L-track. A latch is pivotally coupled to the foot, wherein the latch comprises a retaining lug configured to concurrently fit into two successive circular openings of the L-track and a straight rail opening in the L-track connecting the two circular openings.

Another illustrative embodiment provides a decking beam end foot. The foot comprises a U-shaped slider section configured to be pivotally coupled to a decking beam end, wherein the slider section further comprises a flanged head configured to be slidably captured within a capture area of an L-track. A latch is pivotally coupled to the slider section, wherein the latch comprises a retaining lug configured to concurrently fit into two successive circular openings of the L-track and a straight rail opening in the L-track connecting the two circular openings.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that typical beam end latches used with industry standard L-tracks do not closely follow the contours of the track. As a result, the uneven distribution of forces across the contact between the L-track surfaces and latch can increase wear on both the track and latch, resulting in chipping, cracking, and breaking of the latch in this high wear area.

Illustrative embodiments provide a decking beam end with an improved latch design that matches the contours of L-track opening. The latch comprises a retaining lug with a unique "anchor" shape that includes curved upper and lower ends that are designed to engage the round openings on an L-track and a straight center section (bridge) connecting the two ends. The straight center finger engages the straight track openings that intersperse the round openings of the L-track. As a result, the anchor shape of the lug, when engaged into the track, mirrors the contours of the L-track and mates to the entire shape of the track, not just the round openings, thereby providing both a more secure fit to the track and greater distribution of forces. The maximum surface to surface critical mass contact has created the strongest latch that will wear less on the track and foot assembly. The latch is held in place by a two-leg coil spring, which increase spring pressure to ensure safety and also provides redundancy should one leg of the spring coil break.

Figure 1:
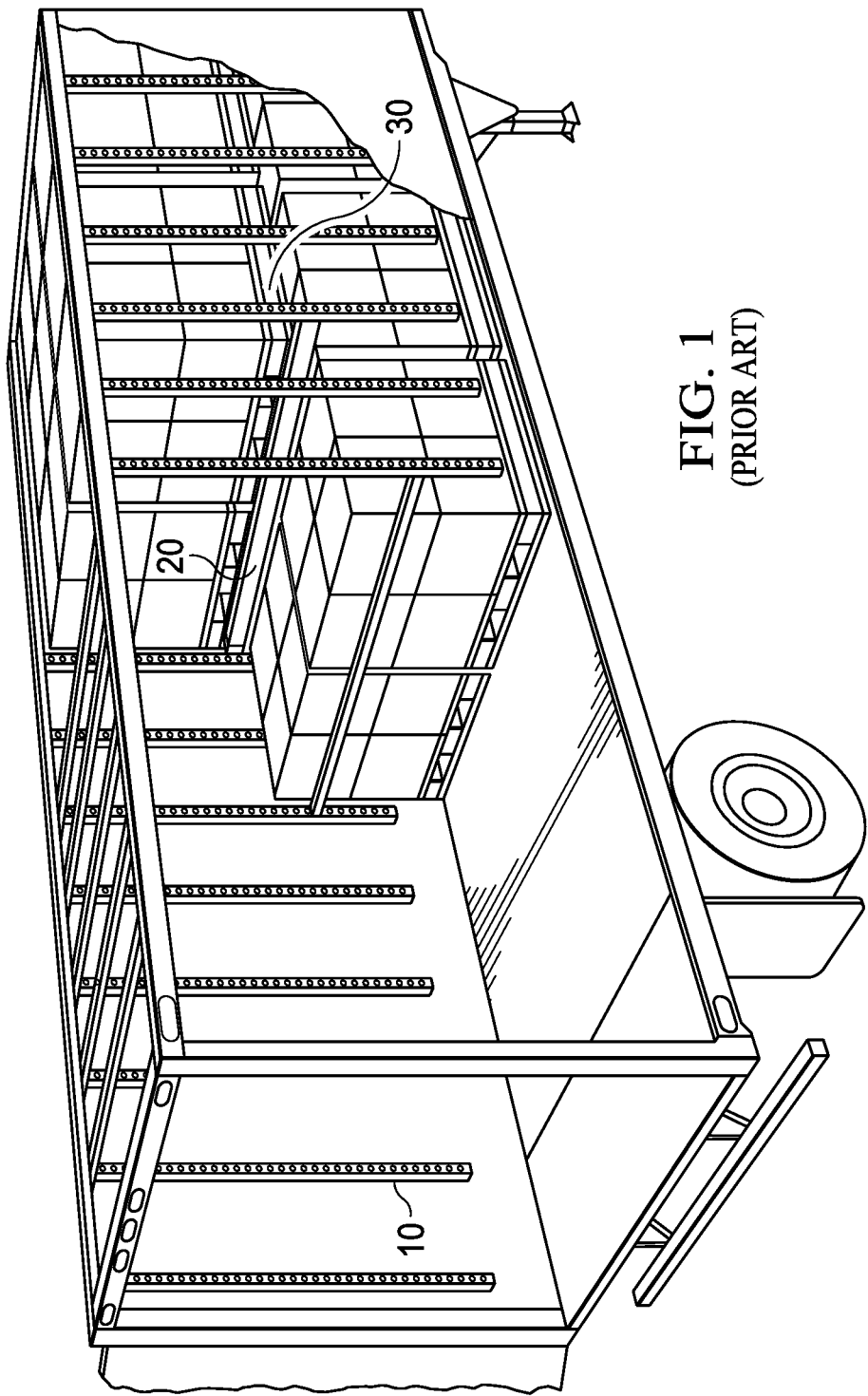
FIG. 1 depicts a cut-away perspective view of a truck trailer employing a cargo beam and decking system in accordance with the prior art.

FIG. 1 illustrates a typical cargo beam and decking system in accordance with the prior art. FIG. 1 is a cut-away perspective view of a truck trailer containing two rows and stacks of cargo pallets. As shown, a series of vertical mounting tracks 10 line the walls along the length of the cargo container. Each of the mounting tracks 10 includes a series of openings for adjusting the height of the decking beams. In the present example four decking beams 20 span the width of the trailer, providing support for the top layer of cargo pallets 30.

Figure 2:
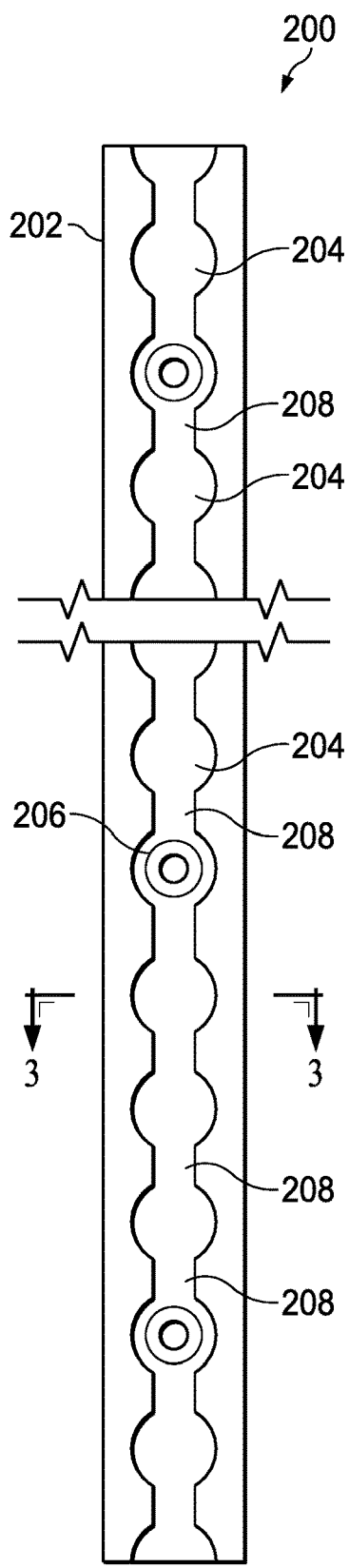
FIG. 2 illustrates a front view of a cargo container L-track with which the illustrative embodiments can be implemented.
Figure 3:
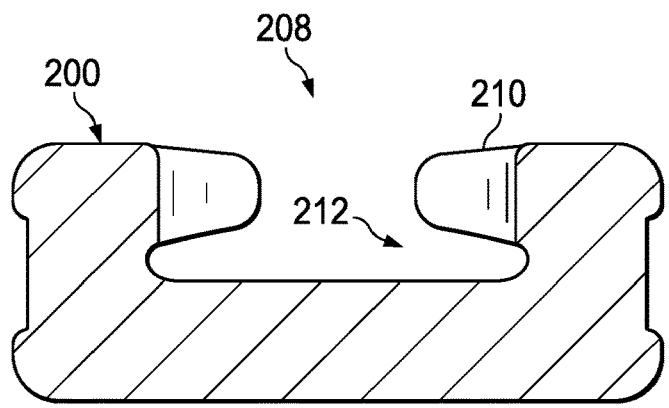
FIG. 3 illustrates an end cross-section view of the cargo container L-track with which the illustrative embodiments can be implemented.

FIG. 2 illustrates a front view of a cargo container L-track with which the illustrative embodiments can be implemented. FIG. 3 illustrates an end cross-section view of the cargo container L-track. L-tracks are a standard design within the shipping industry and are also known as airline tracks. The L-track 200 in FIGS. 2 and 3 is an example of mounting track 10 in FIG. 1.

L-tracks comprise a main rail body 202, which can be mounted to the walls of truck trailers as shown in FIG. 1. Along the length of rail body 202 are a number of regularly spaced circular openings 204, which accommodate retaining lugs that can be temporarily inserted into circular openings 204 to hold a decking beam in place as shown in FIG. 1. The number of circular openings 204 along rail body 202 allow the position of a decking beam to be adjusted upward or downward along the L-track 200. The standard diameter of each circular opening 204 of an L-track is approximately 0.78 in. (19.8 mm), and the distance between the centers of successive circular openings is approximately 1.00 in. (25.4 mm).

A subset of the circular openings 204 also include installation holes 206, that accommodate screws for securing the L-track to a structure such as a cargo container or truck trailer wall.

Interspersed between and connecting the circular openings 204 are straight openings 208 along rail body 202. In an industry standard L-track, the straight rail openings 208 between circular openings 204 are approximately 0.425 in. (10.8 mm) wide.

As shown more clearly in the cross-section view of FIG. 3, the overhang lip 210 of the straight rail openings 208 produces a capture area 212. As shown in more detail below, the capture area 212 holds a slider foot of a decking beam end in the L-track rail body 202, while the straight openings 208 between circular openings 204 allow the slider foot to slide up and down along the L-track 200 unimpeded. For this reason, L-tracks are sometimes referred to as capture tracks.

Figure 4:
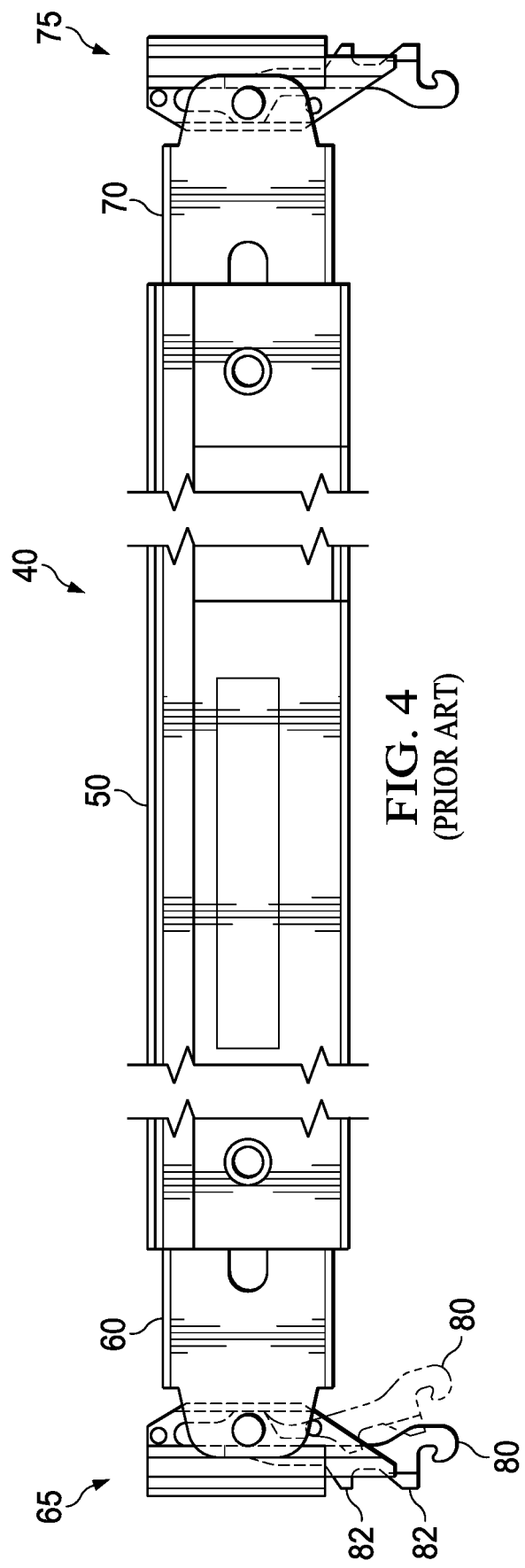
FIG. 4 is a side view of an adjustable decking beam in accordance with the prior art.

FIG. 4 is a side view of an adjustable decking beam in accordance with the prior art. The beam 40 comprises a central section 50 that is hollow and two adjustable end pieces 60, 70 that are slidably disposed within the ends of the beam. Each end piece further comprises a "foot" 65, 75 that can be slidably disposed along the vertical mounting tracks shown in FIGS. 1-3.

The feet 65, 75 each a have a spring loaded, trigger retaining latch 80 that engages and disengages with the openings in the mounting tracks, thereby allowing the beam 40 to be locked into place at different heights, according to the needs of the user. Retaining lugs 82 in the retaining latch 80 are configured to fit into the circular openings 204 (shown in FIG. 2) of an L-track. The retaining lugs 82 can be thought of as analogous to a latch bolt of a door handle and are even similarly shaped to latch bolts with a downward sloping upward surface.

A drawback of prior art designs such as that shown in FIG. 4, is that the retaining lugs 82 only engage the circular openings 204 of the L-track. As a result, forces transmitting through the decking beam (which can be quite considerable) are only applied against the edges of the circular openings. Conversely, stress against the retaining latch 80 is applied by the L-track at the discrete contact points of the retaining lugs 82. The result of this uneven distribution of forces and contact areas is increased wear on the L-track and retaining latch, leading to chipping and cracking and possible failure of the latch.

Figure 5:
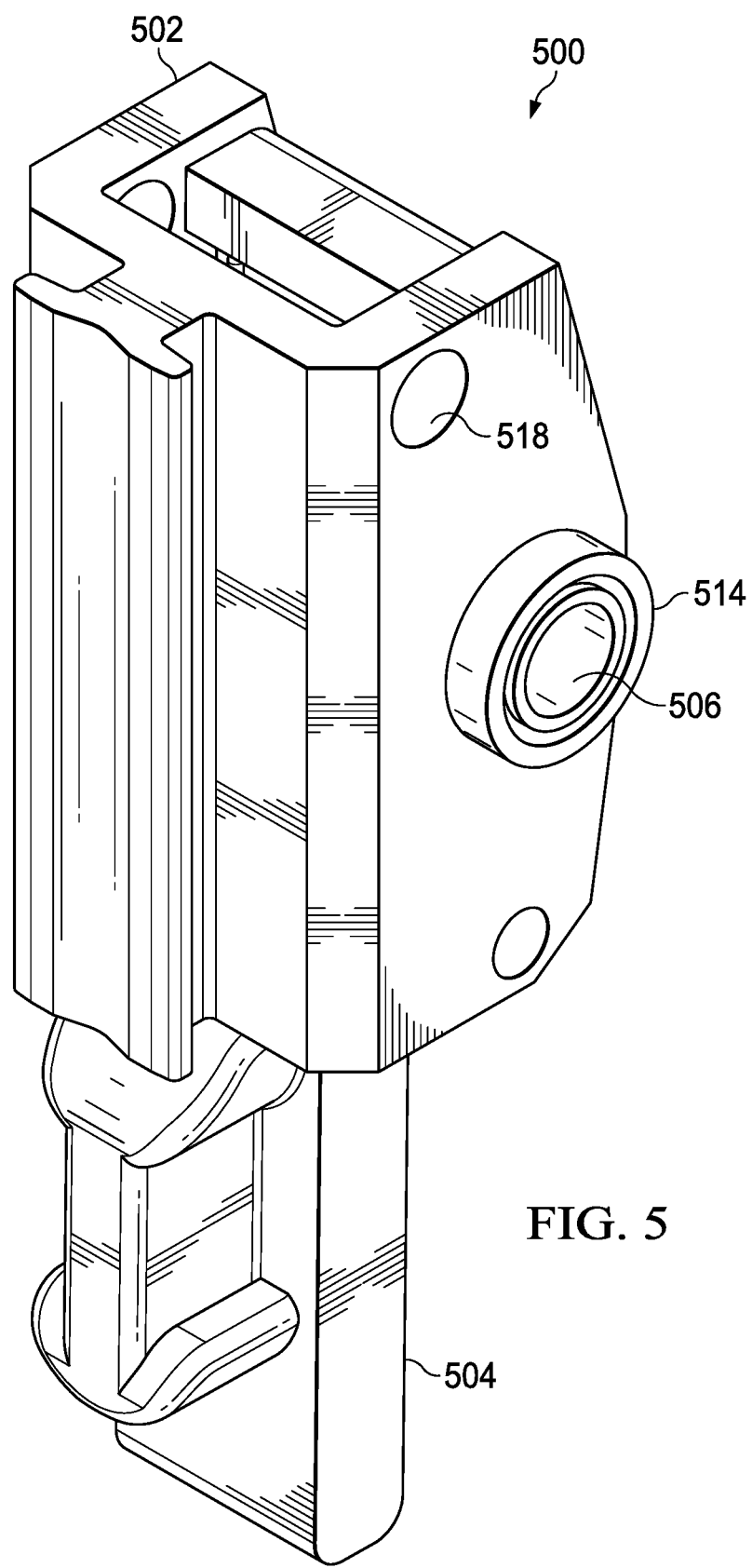
FIG. 5 illustrates a perspective view of a decking beam foot section in accordance with an illustrative embodiment.
Figure 6:
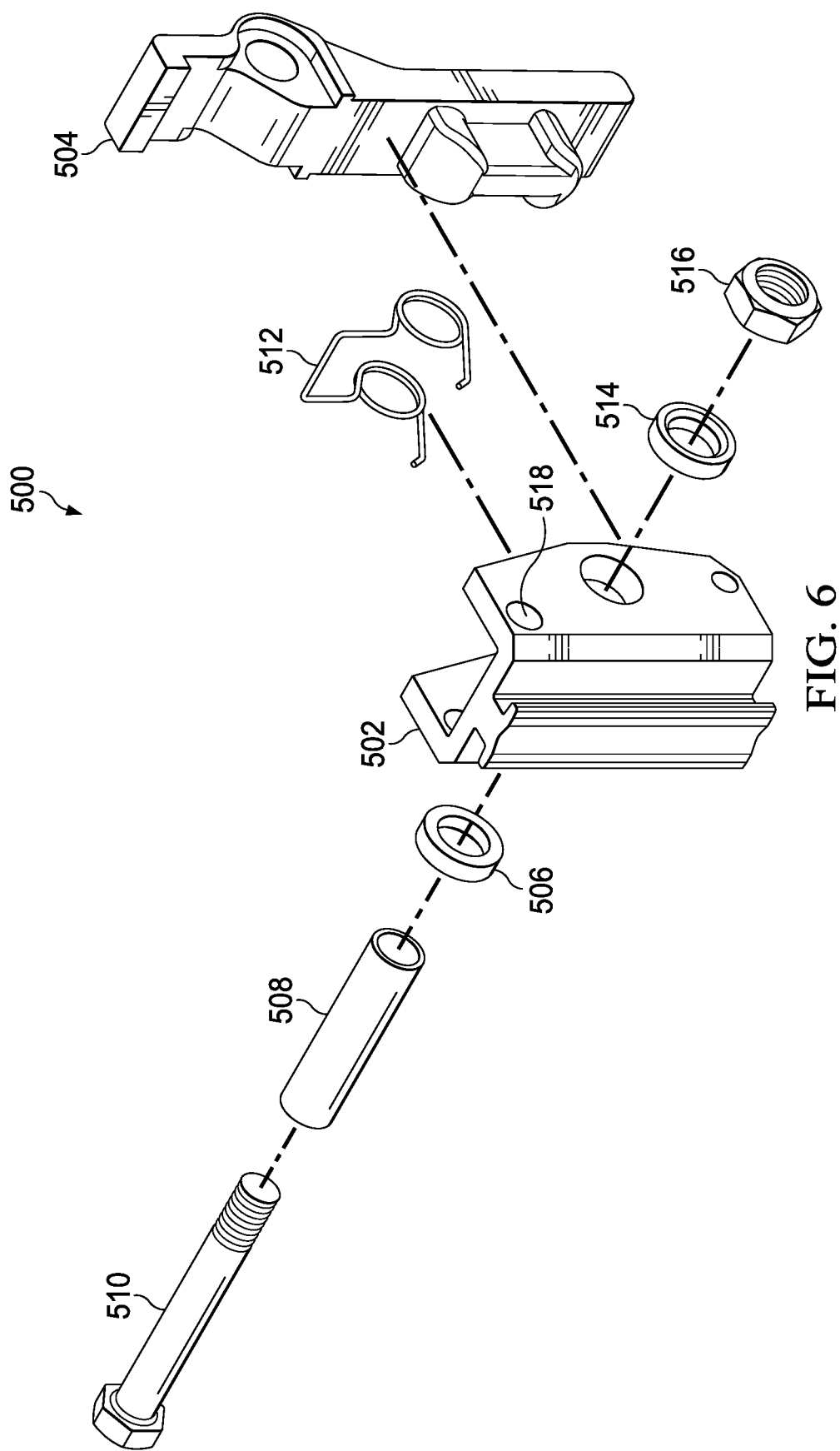
FIG. 6 illustrates and exploded view of a decking beam end foot section in accordance with an illustrative embodiment.

FIG. 5 illustrates a perspective view of a decking beam foot section in accordance with an illustrative embodiment. FIG. 6 illustrates and exploded view of the decking beam end foot section. The foot section 500 comprises a slider section 502 that is configured to engage and be held by the capture area 212 of an L-track and slide up and down the rail body 202 of the L-track.

A retaining latch 504 is held inside the slider section 502 by a bolt 510, around which the retaining latch 504 pivots. The bolt 510 fits inside an insert tube 508 that captures all loose parts and ensures a tighter fit. Spacers 506, 514 are placed on either side between the slider section 502 and the head of the bolt 510 and nut 516, respectively.

The two-leg return spring 512 applies a retaining force against the upper arm of the retaining latch 504 and biases the latch in a closed position by default. Because of the two-leg configuration, return spring 512 provides greater and more evenly distributed retention force that a single-leg spring and also provides redundancy should one of the spring legs fail.

Slider section 502 also comprises opposing locking holes 518 that align when the latch 504 is in the closed position. A pin or lock can be inserted into locking hole 518 to keep the latch 504 closed by preventing from rotating, thereby locking the beam end in place on the L-track.

Figure 7:
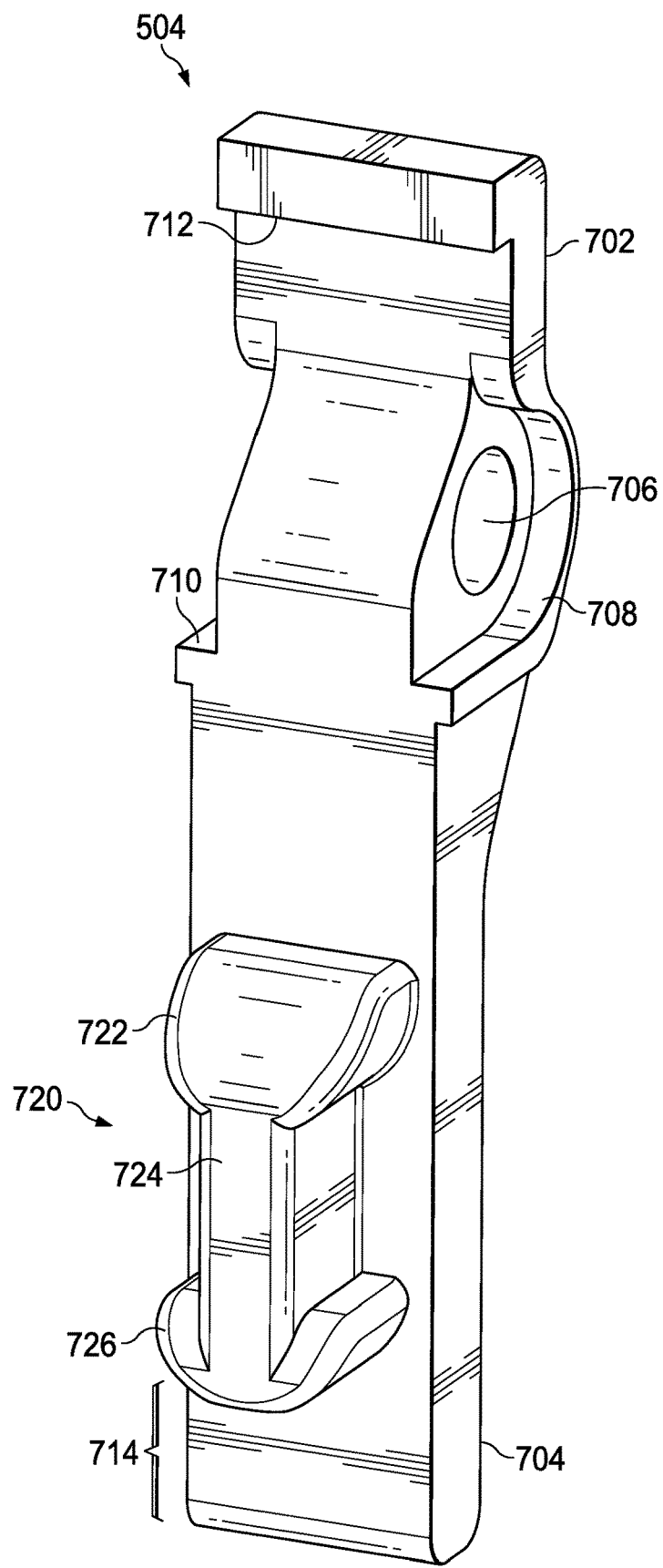
FIG. 7 illustrates a front, perspective view of a cargo decking beam end retaining latch in accordance with an illustrative embodiment.

FIG. 7 illustrates a front, perspective view of a cargo decking beam end retaining latch in accordance with an illustrative embodiment. FIG. 7 provides a closer view of retaining latch 504 in FIGS. 5 and 6. The retaining latch 504 comprises several contours and features which contribute to its functionality. The retaining latch 504 can be roughly divided into an upper arm 702 and a lower arm 704, respectively above and below the bolt through hole 706 that serves as the axis of rotation for the latch.

On either later side of the through hole 706 are rounded spring coil retention grooves 708, 710 which are configured to hold the two coil sections of the two-leg spring 512. Located on the upper arm 702 is a spring retention lip 712 configured to hold the cross bar of the two-leg spring 512 that applies force against the upper arm 702.

On the lower arm 704 of the retaining latch 504 is a retaining lug 720 configured to concurrently fit into two successive circular openings of an L-track as well as the straight rail opening in the L-track connecting the two circular openings. The retaining lug 720 has an "anchor" shape, seen most clearly in FIG. 11. The lug 720 comprises three main sections, a rounded top section 722, a straight bridge section 724, and a rounded bottom section 726.

The lug top section 722 comprises a downwardly convex, curved lower surface with a semicircular radius sized to fit into a circular opening 204 of an industry standard L-track. The lug top section 722 also comprises an upper surface that is downward sloping and with a rounded trapezoidal taper to the bridge section 724. In an embodiment, the downward slope of the upper surface of the top section 722 is approximately 45°.

The bridge section 724 connects the top section 722 and bottom section 726 of the retaining lug 720. The straight bridge section 724 a width that is sized to fit into a straight rail opening 208 that connects two successive circular openings 204 in an industry standard L-track. An advantage of the straight bridge section 724 configured to fit into the straight rail openings 208 of an L-track is that forces between the retaining lug 720 and the L-track are distributed over a larger contact surface than convention beam end retaining latches that only engage the circular openings in L-tracks. Compared to convention retaining latches that only engage the circular openings, this increased contact surface and distribution of force provided by the bridge 724 reduces wear and tear on both the L-track and retaining lug 720 and increases the area of the L-track over which retaining forces are applied. By extending into the straight rail opening 208 of the L-track, the bridge section 724 allows the beam end foot 500 to withstand greater horizontal force without damage than conventional latches that only engage the circular openings of the L-track.

The bottom section 726 of the retaining lug 720 also comprises a downwardly convex, curved lower surface with a semicircular radius sized to fit into a circular opening 204 of an industry standard L-track. The bridge section 724 occupies the center of the top surface of the bottom section 726, forming lateral upper surface ledges on either side of the bridge 724.

The bottom of the lower arm 704 includes a handle section 714 comprising a between the lower surface of the lug bottom 726 and the end of the lower arm 704. The handle 714 can be used to pull the lower arm 704 back and disengage the retaining lug 720 from the L-track, thereby allowing the decking beam end to be moved along the L-track.

Figure 8:
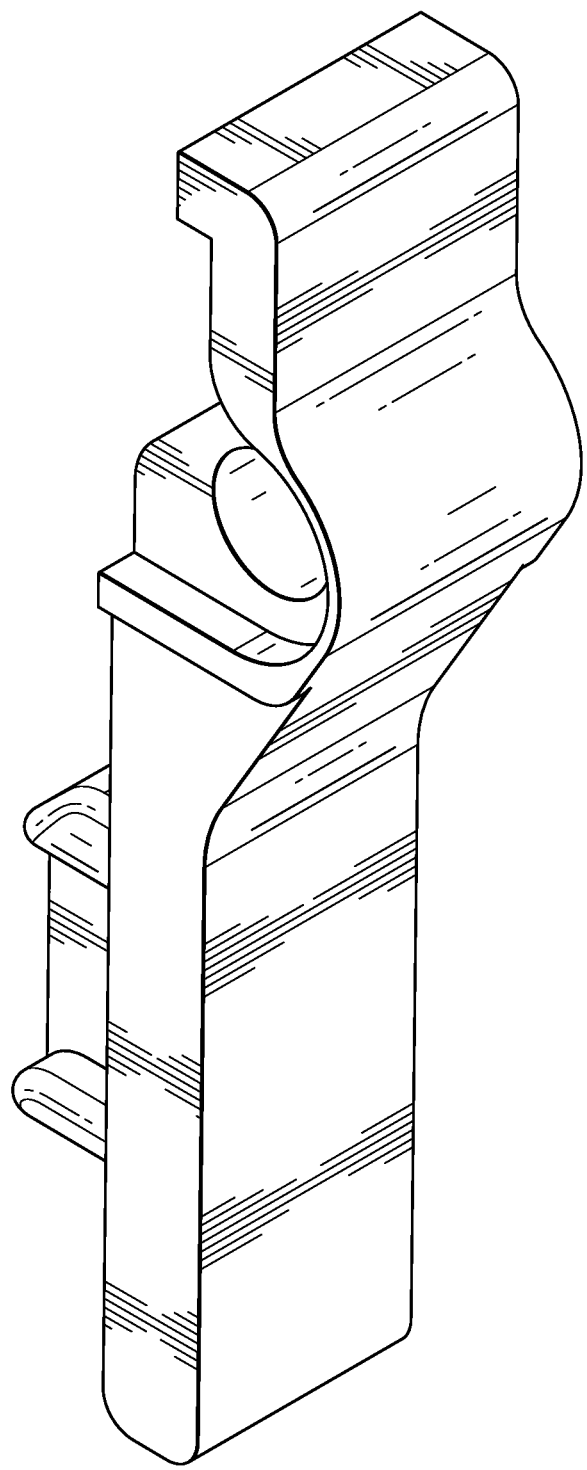
FIG. 8 illustrates a back, perspective view of a cargo decking beam end retaining latch in accordance with an illustrative embodiment.

FIG. 8 illustrates a back, perspective view of a cargo decking beam end retaining latch in accordance with an illustrative embodiment.

Figure 9:
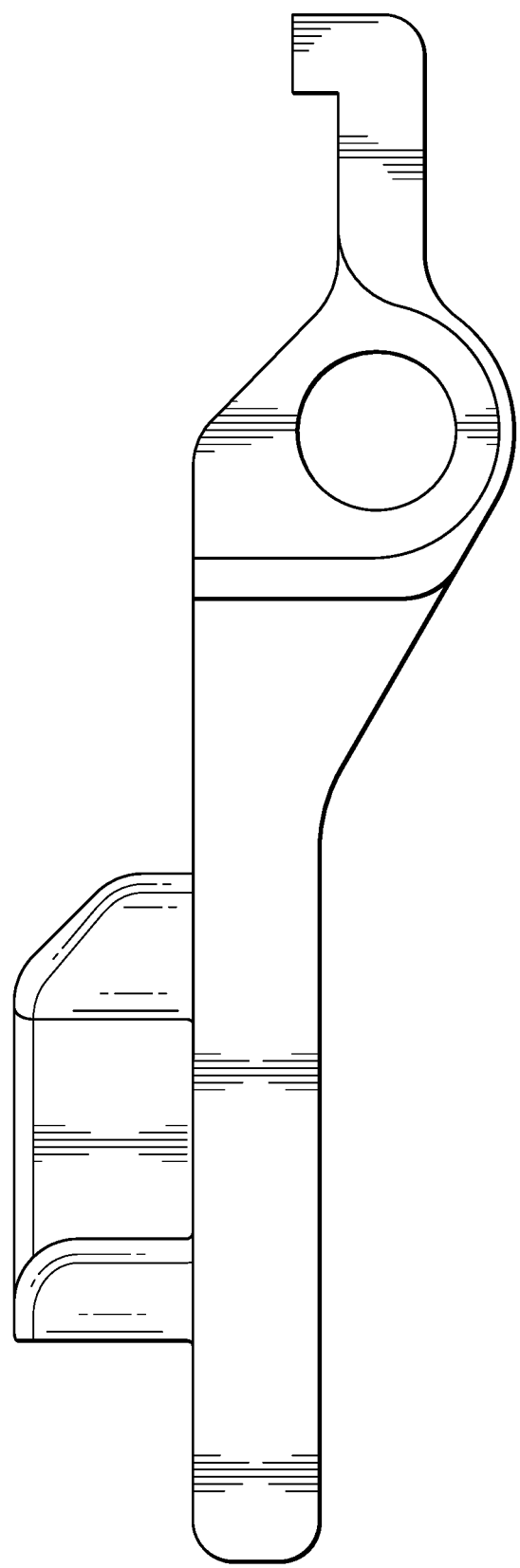
FIG. 9 illustrates a right, side view of a cargo decking beam end retaining latch in accordance with an illustrative embodiment.

FIG. 9 illustrates a right, side view of a cargo decking beam end retaining latch in accordance with an illustrative embodiment.

Figure 10:
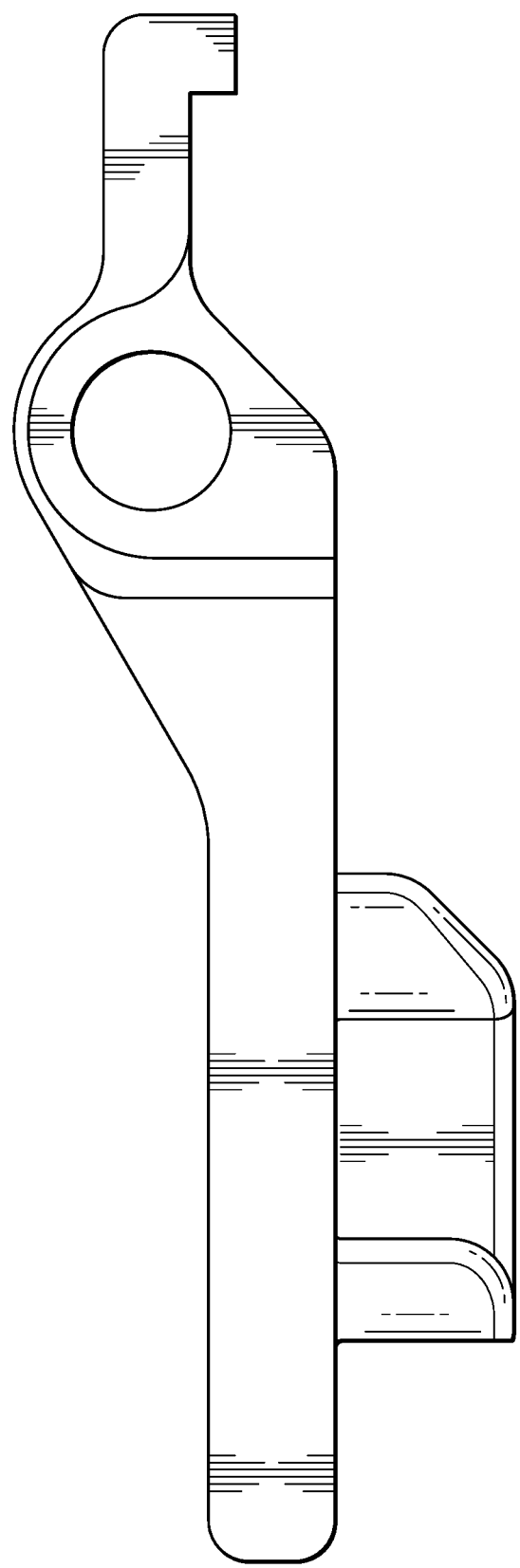
FIG. 10 illustrates a left, side view of a cargo decking beam end retaining latch in accordance with an illustrative embodiment.

FIG. 10 illustrates a left, side view of a cargo decking beam end retaining latch in accordance with an illustrative embodiment.

Figure 11:
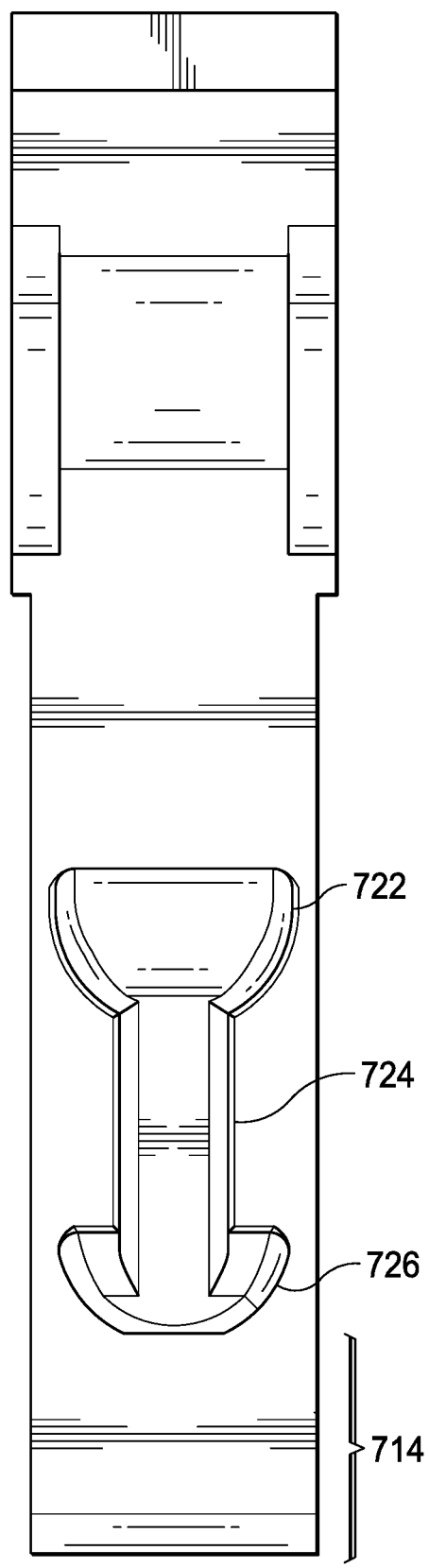
FIG. 11 illustrates a front view of a cargo decking beam end retaining latch in accordance with an illustrative embodiment.

FIG. 11 illustrates a front view of a cargo decking beam end retaining latch in accordance with an illustrative embodiment.

Figure 12:
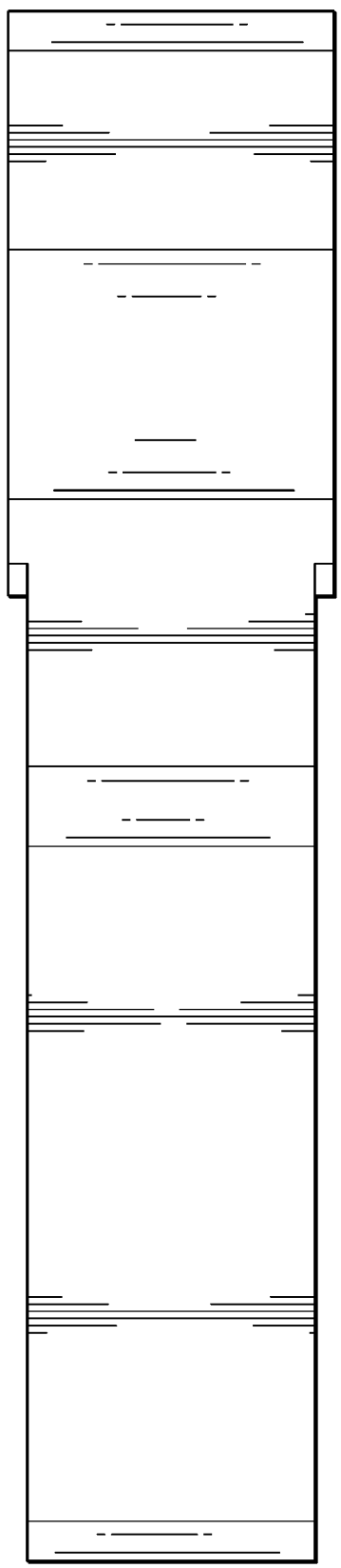
FIG. 12 illustrates a back view of a cargo decking beam end retaining latch in accordance with an illustrative embodiment.

FIG. 12 illustrates a back view of a cargo decking beam end retaining latch in accordance with an illustrative embodiment.

Figure 13:
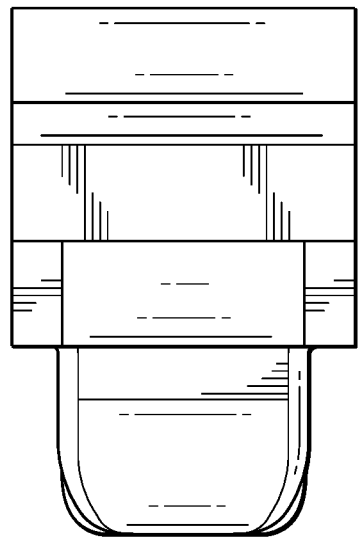
FIG. 13 illustrates a top view of a cargo decking beam end retaining latch in accordance with an illustrative embodiment.

FIG. 13 illustrates a top view of a cargo decking beam end retaining latch in accordance with an illustrative embodiment.

Figure 14:
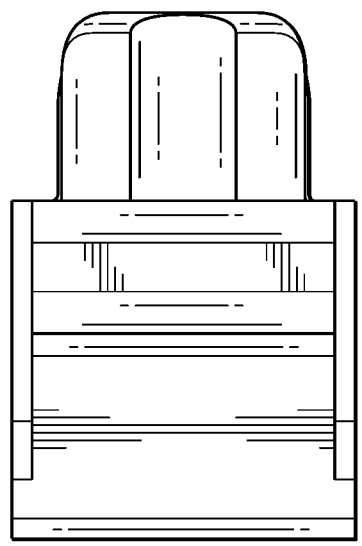
FIG. 14 illustrates a bottom view of a cargo decking beam end retaining latch in accordance with an illustrative embodiment.

FIG. 14 illustrates a bottom view of a cargo decking beam end retaining latch in accordance with an illustrative embodiment.

Figure 15:
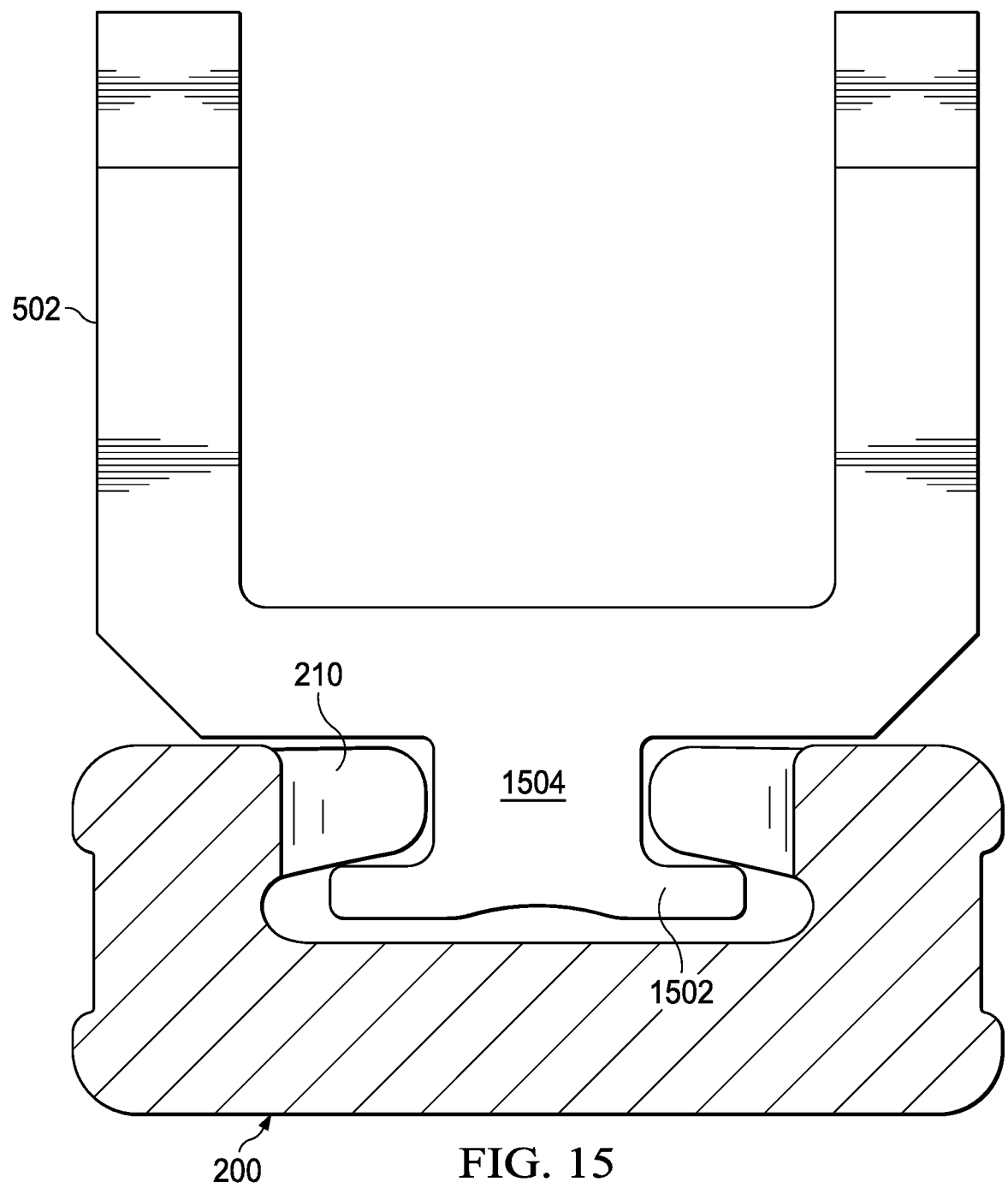
FIG. 15 illustrates an end cross-section view of a beam end foot slider section engaged in an L-track in accordance with an illustrative embodiment.

FIG. 15 illustrates an end cross-section view of a beam end foot slider section engaged in an L-track in accordance with an illustrative embodiment. As shown, slider section 502 is generally U-shaped and comprises a flanged track head 1502 that is configured to be slidably captured within the capture area of the L-track produced by the overhang lips 210 of the straight rail openings 208. The flanged track head 1502 is connected to the body of the slider section 502 by a neck portion 1504 that is configured and sized to slide within the straight rail openings 208 of the L-track and the decking beam end is move up or down the L-track.

Figure 16:
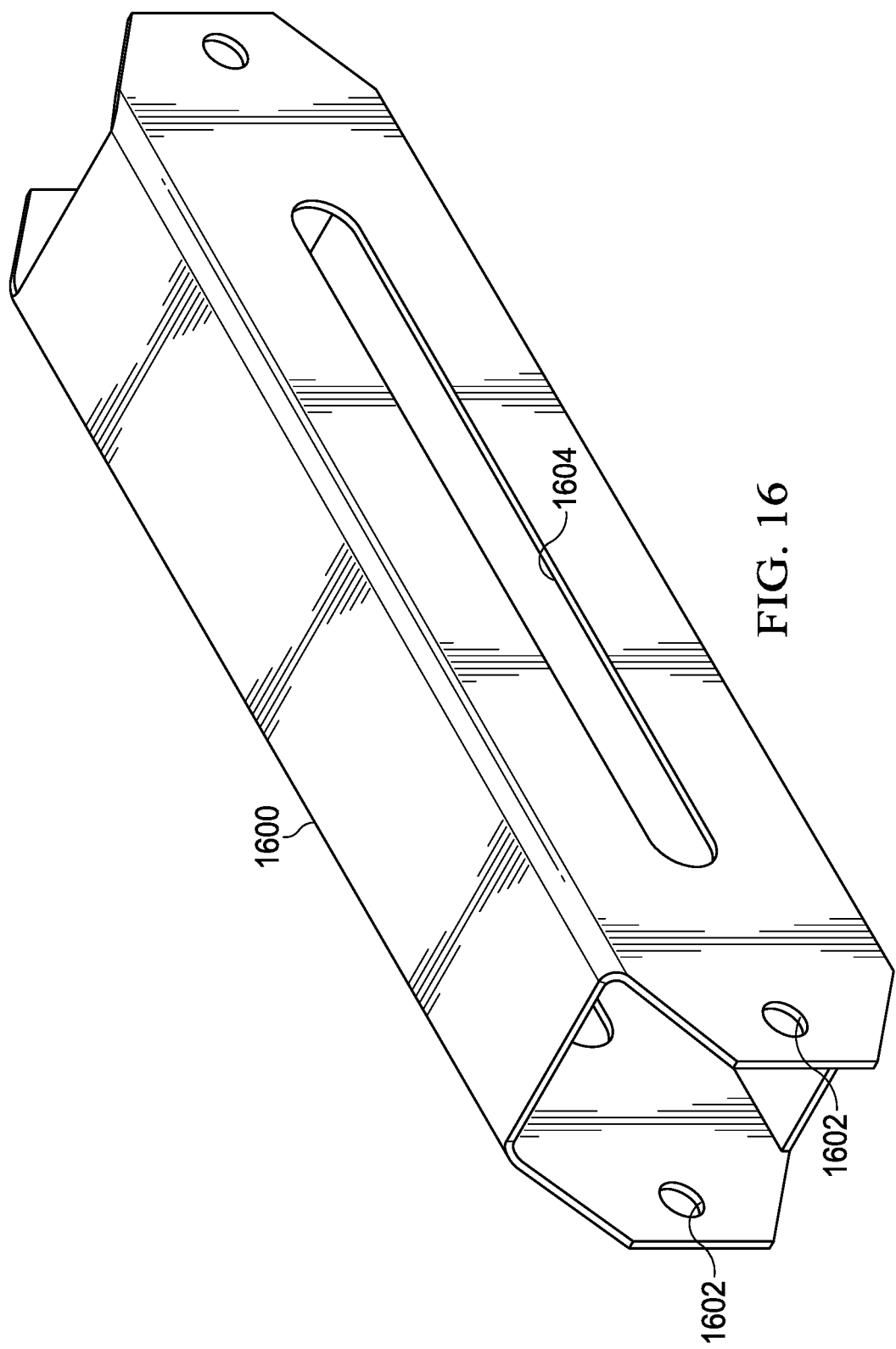
FIG. 16 illustrates a perspective view of an adjustable decking beam with which an illustrative embodiment can be implemented.

FIG. 16 illustrates a perspective view of an adjustable decking beam with which an illustrative embodiment can be implemented. The beam end body 1600 is configured to be slidably inserted into the opening at the end of a decking beam member, shown in FIG. 18.

A beam end foot 500 can be pivotally coupled to the beam end 1600 by means of end holes 1602, through which bolt 510 can be inserted. Because beam end body 1600 is symmetrical, with end holes 1602 at both ends, the end foot 500 can be attached to either end. Therefore, if beam end body 1600 becomes damaged the user can simply remove the beam end from the decking beam and reinsert it in reverse and use the opposite end.

Figure 18:
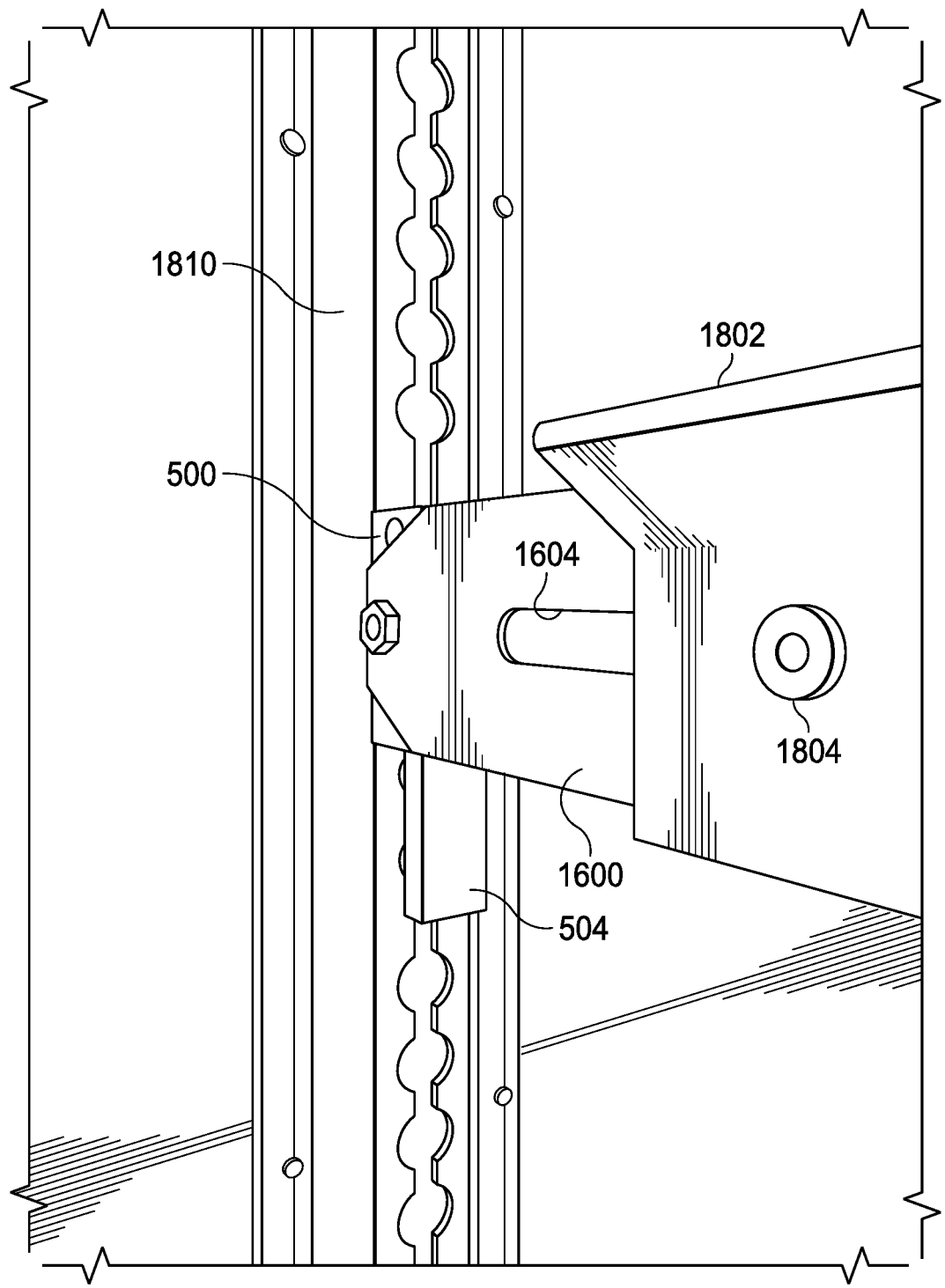
FIG. 18 illustrates a decking beam mounted on an L-track in accordance with an illustrative embodiment.

Elongated slots 1604 on either side of the beam end 1600 allow the position of the beam end to be telescopically adjusted within the decking beam (see FIG. 18).

Figure 17:
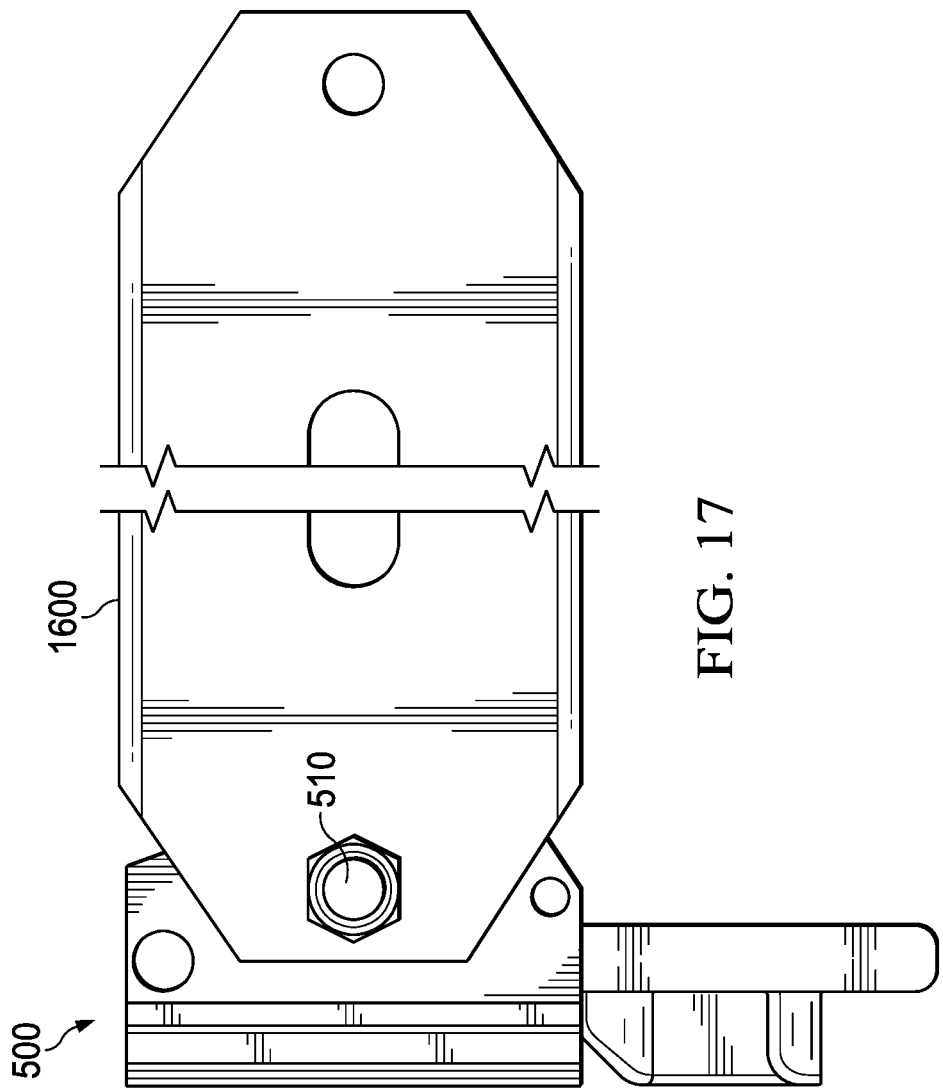
FIG. 17 illustrates a side view of a beam end foot pivotally coupled to an end of beam end body by means of bolt in accordance with an illustrative embodiment.

FIG. 17 illustrates a side view of a beam end foot 500 pivotally coupled to an end of beam end body 1600 by means of bolt 510 in accordance with an illustrative embodiment.

FIG. 18 illustrates a decking beam mounted on an L-track in accordance with an illustrative embodiment. As shown, beam end body 1600 is slidable inserted into a hollow decking beam member 1802. An identical beam end (not shown) is be inserted at the opposite end of the decking beam 1802. A retaining bolt 1804 extends through the sides of the decking beam 1802 and is slidably disposed within the slots 1604 of the beam end 1600.

The decking beam 1802 is mounted to the L-track 1810 by means of the foot 500 that is pivotally coupled to the beam end 1600 as shown. As shown, retaining latch 504 is engaged with the successive circular openings and the straight rail opening connecting them, thereby holding the decking beam 1802 in place.

Figure 19:
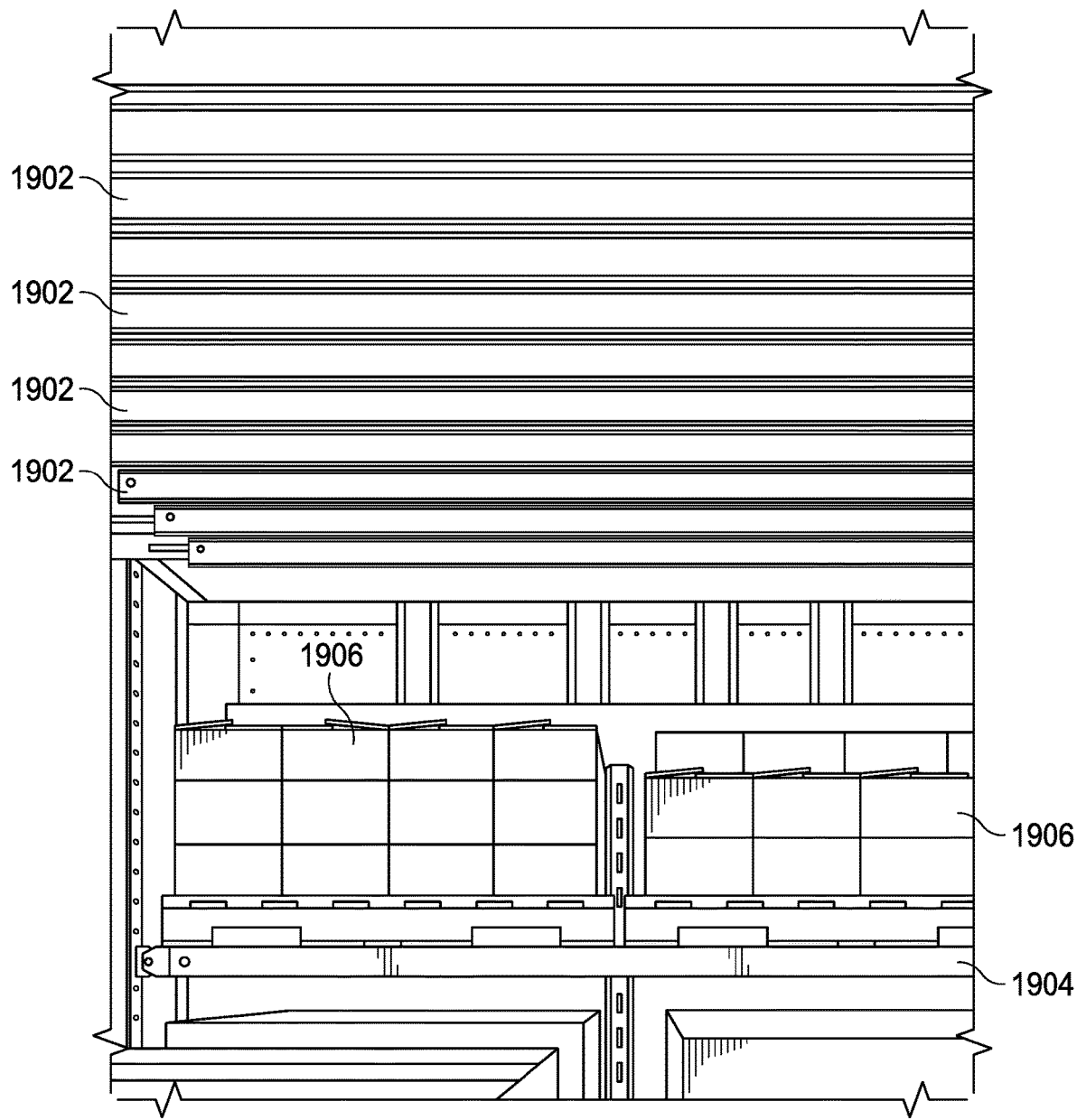
FIG. 19 illustrates a number of decking beams stored out of the way when not in use in accordance with an illustrative embodiment.

FIG. 19 illustrates a number of decking beams stored out of the way when not in use in accordance with an illustrative embodiment. When decking beams are not in use, they can be moved to the top of an L-track and locked in place out of the way. In the example shown in FIG. 19, a number of decking beams 1902 have been positioned at the top of the cargo container. Decking beam 1904 is positioned to hold cargo pallets 1906.

As used herein, the phrase "a number" means one or more. The phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item C. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A decking beam end assembly, comprising:
   a beam end body configured to be slidably disposed within an end of a hollow beam member;
   a U-shaped foot pivotally coupled to the beam end body, wherein the foot further comprises a flanged head configured to be slidably captured within a capture area of an L-track; and
   a latch pivotally coupled to the foot, wherein the latch comprises a retaining lug configured to concurrently fit into two successive circular openings of the L-track and a straight rail opening in the L-track connecting the two circular openings.

2. The decking beam end assembly of claim 1, further comprising a two-leg return spring coupled to the foot and latch, wherein the return spring is configured to bias the latch in a closed position.

3. The decking beam end assembly of claim 1, wherein the retaining lug comprises:
   a top section comprising a curved lower surface with a semicircular radius sized to fit into a circular opening of the L-track;
   a bottom section comprising a curved lower surface with a semicircular radius sized to fit into a circular opening of the L-track; and
   a straight bridge section connecting the top section and bottom section, wherein the straight bridge section has a width sized to fit into a straight rail opening between successive circular openings in the L-track.

4. The decking beam end assembly of claim 3, wherein the top section of the retaining lug further comprises a downward sloping upper surface with a rounded trapezoidal taper to the bridge section.

5. The decking beam end assembly of claim 1, wherein the foot further comprises opposing holes that align when the latch is in a closed position to allow a pin or lock to be inserted through them to keep the latch closed.

6. An adjustable decking system for use in a cargo container, the decking system comprising:
   a pair of L-tracks vertically mounted on opposite interior walls of a cargo container;
   a hollow decking beam configured to support cargo loads;
   first and second end assemblies at opposite ends of the decking beam, wherein each end assembly comprises:
      a beam end body configured to be slidably disposed within an end of the decking beam;
      a U-shaped foot pivotally coupled to the beam end body, wherein the foot comprises a flanged head configured to be slidably captured within a capture area of the L-track; and
      a latch pivotally coupled to the foot, wherein the latch comprises a retaining lug configured to concurrently fit into two successive circular openings of the L-track and a straight rail opening in the L-track connecting the two circular openings.

7. The adjustable decking system of claim 6, further comprising a two-leg return spring coupled to the foot and latch of each end assembly, wherein the return spring is configured to bias the latch in a closed position.

8. The adjustable decking system of claim 6, wherein the retaining lug of each latch comprises:
   a top section comprising a curved lower surface with a semicircular radius sized to fit into a circular opening of the L-track;
   a bottom section comprising a curved lower surface with a semicircular radius sized to fit into a circular opening of the L-track; and
   a straight bridge section connecting the top section and bottom section, wherein the straight bridge section has a width sized to fit into a straight rail opening between successive circular openings in the L-track.

9. The adjustable decking system of claim 8, wherein the top section of each retaining lug further comprises a downward sloping upper surface with a rounded trapezoidal taper to the bridge section.

10. The adjustable decking system of claim 6, wherein the foot of each beam end assembly further comprises opposing holes that align when the latch is in a closed position to allow a pin or lock to be inserted through them to keep the latch closed.

11. A decking beam end foot, comprising:
    a U-shaped slider section configured to be pivotally coupled to a decking beam end, wherein the slider section further comprises a flanged head configured to be slidably captured within a capture area of an L-track; and a latch pivotally coupled to the slider section, wherein the latch comprises a retaining lug configured to concurrently fit into two successive circular openings of the L-track and a straight rail opening in the L-track connecting the two circular openings.

12. The decking beam end foot of claim 11, further comprising a two-leg return spring coupled to the slider section and latch, wherein the return spring is configured to bias the latch in a closed position.

13. The decking beam end foot of claim 11, wherein the retaining lug comprises:
   a top section comprising a curved lower surface with a semicircular radius sized to fit into a circular opening of the L-track;
   a bottom section comprising a curved lower surface with a semicircular radius sized to fit into a circular opening of the L-track; and
   a straight bridge section connecting the top section and bottom section, wherein the straight bridge section has a width sized to fit into a straight rail opening between successive circular openings in the L-track.

14. The decking beam end foot of claim 13, wherein the top section of the retaining lug further comprises a downward sloping upper surface and a rounded trapezoidal taper to the bridge section.

15. The decking beam end foot of claim 11, wherein the slider section further comprises opposing holes that align when the latch is in a closed position to allow a pin or lock to be inserted through them to keep the latch closed.

* * * * *